United States Patent

[11] 3,578,857

[72] Inventor   Edwin Busch
                214 S. Hamilton St., Saginaw, Mich. 48602
[21] Appl. No.  886,420
[22] Filed      Jan. 27, 1970
[45] Patented   May 18, 1971
                Continuation-in-part of application Ser. No.
                697,201, Jan. 11, 1968. This application
                Jan. 27, 1970, Ser. No. 886,420

[54] PLURAL UNIT PROJECTION SYSTEM
     22 Claims, 7 Drawing Figs.
[52] U.S. Cl. .................................... 353/94,
                                                 353/77
[51] Int. Cl. ...................................... G03b 21/26
[50] Field of Search ........................... 353/94, 48,
                                                 77, 78

[56]              References Cited
             UNITED STATES PATENTS
3,040,622   6/1962   Reddle et al. ................. 353/94
3,283,652   11/1966  Busch .......................... 353/94

Primary Examiner—Harry N. Haroian
Attorney—Learman and McCulloch

ABSTRACT: A multiple unit projection system for transmitting images to a remote screen wherein a plurality of projectors selectively project an image on the screen along a common image projecting path. At least a pair of the projectors are individually movable from a remote inoperative position to an image projecting position and apparatus is provided for shifting at least one of the movable projectors from the remote inoperative position to an image projecting position and to simultaneously automatically shift at least one of the other movable projectors to its remote position. Mirror means is provided to transmit the image emanating from one of the projectors to the screen along the image projecting path.

INVENTOR
EDWIN BUSCH
BY
Learman & McCulloch

INVENTOR
EDWIN BUSCH

BY
Learman & McCulloch

INVENTOR
EDWIN BUSCH

BY
Learman & McCulloch

PLURAL UNIT PROJECTION SYSTEM

This application is a continuation-in-part of my U.S. Pat. application Ser. No. 697,201 filed Jan. 11, 1968.

This invention relates to projectors and more particularly to a multiple unit projection system for transmitting images to a remote screen from one of a plurality of projectors.

One of the prime objects of the invention is to provide a multiple unit projection system capable of transmitting images selectively from one of a plurality of projection units to a remote screen along a common image projecting path.

A further object of the present invention is to provide a multiple unit projection system wherein remotely located controls provide for the starting of one of a plurality of projectors and the shifting of at least one of the other projectors substantially simultaneously.

Another object of the present invention is to provide a multiple unit projection system wherein a mirror assembly is provided to transmit the image from at least one projector unit to a remote screen and at the same time provide remotely located controls for shifting other projectors into and out of an image projecting path.

Still another object of the present invention is to provide a multiple unit projection system of highly reliable character permitting the selective operation of an increased number of projectors in a compact system which can be economically manufactured for sale to educational institutions and industry in general. Yet another object of the present invention is to provide a multiple unit projection system of the character described wherein a mirror assembly for reflecting an image from one of the projector units is movable therewith.

Briefly, in accordance with the invention, a multiple unit projection system is provided for transmitting images to a remotely located screen wherein first and second projector means, movable from remote positions to an image projecting position, are mounted on support means, and motor means is provided for laterally shifting one of said projector means to a remote position when the other of said projector means is shifted to an image projecting position. A mirror assembly is provided to reflect the images emanating from one of the projectors toward a remotely located screen. A motor may be provided to rotate the mirror assembly when one of the projectors is operated.

Other objects and advantages of the invention will be pointed out specifically or will become apparent from the following description when it is considered in conjunction with the appended claims and the accompanying drawing in which:

Figure 1:
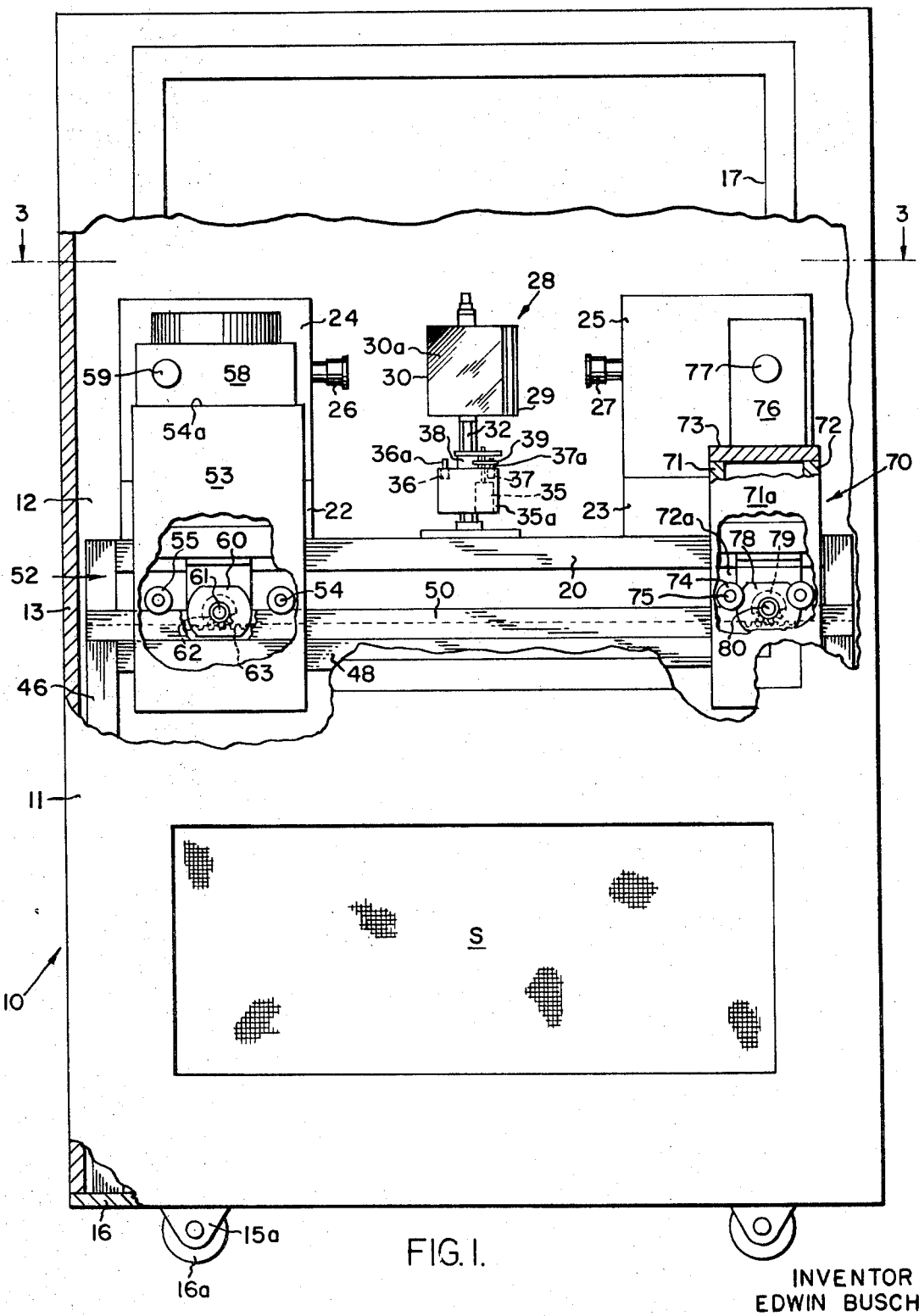
FIG. 1 is a front elevational view of a projection system incorporating the invention, with portions of the housing being broken away to expose the interior thereof.
Figure 2:
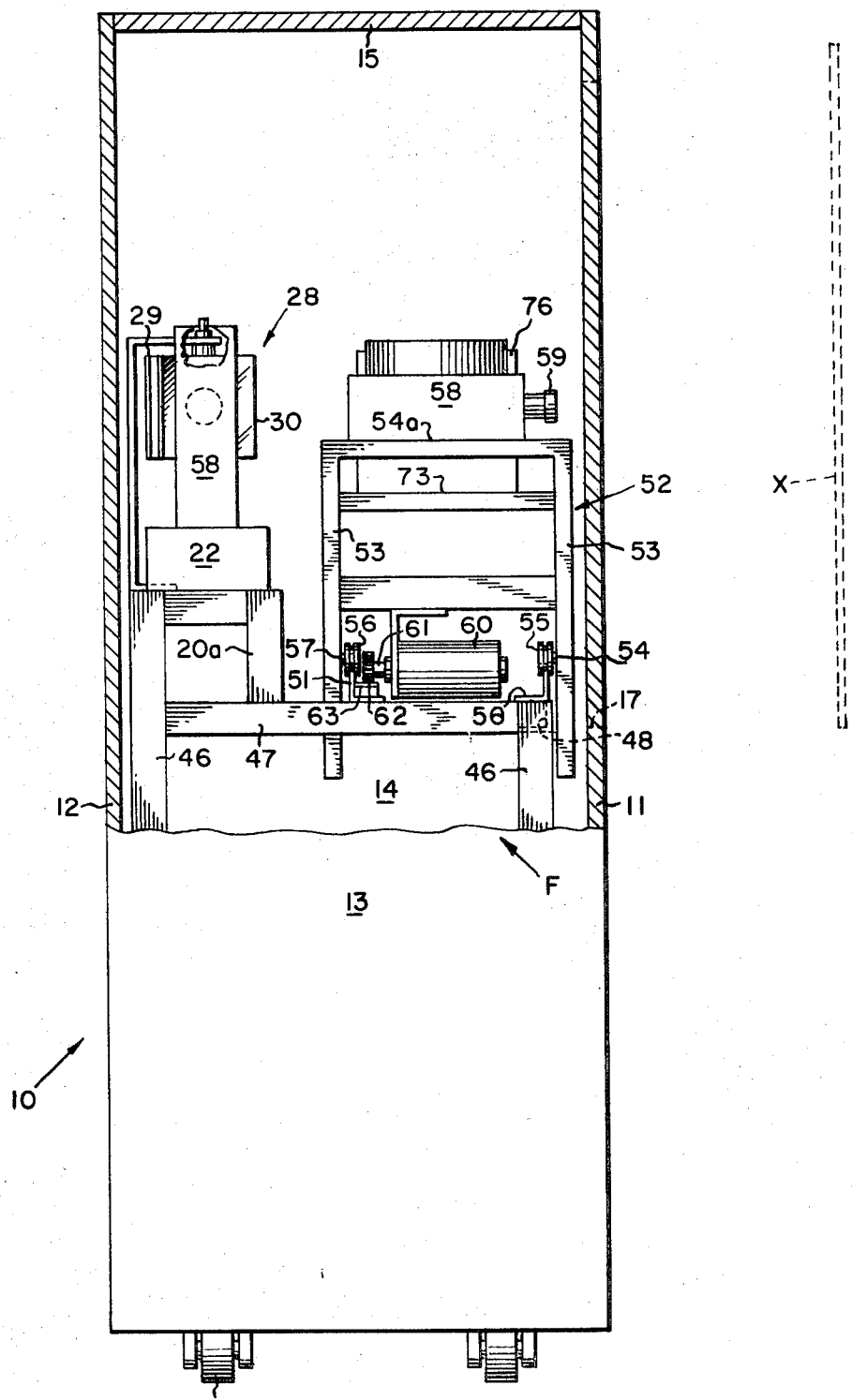
FIG. 2 is a side elevational view partly broken away to expose the interior thereof.

Referring now more particularly to the embodiment illustrated in FIGS. 1—4, a numeral 10 generally indicates a cabinet or housing for the system which comprises front and rear walls 11 and 12, respectively, side walls 13 and 14, a top wall 15, and bottom wall 16. Castor assemblies generally designated 15a, and having wheels 16a, support the cabinet 10 for convenient movement to and from lecture halls, classrooms, and the like. The front wall 11 is provided with a sound speaker grill S in its lower half and an opening 17 in its upper half to permit an image to be projected therethrough to a remotely located screen X (See FIG. 2).

Mounted in the projection cabinet 10 on the fixed framework generally designated F are front and rear vertical members 46 supporting a pair of horizontally extending members 47 adjacent walls 13 and 14 and front and rear longitudinally extending members 48 and 49 respectively spanning members 47. Mounted between oppositely disposed members 47 are a pair of front and rear angle members 50 and 51 which substantially span the distance between opposed walls 13 and 14. The angle members 50 and 51 form tracks for a purpose which will be described more fully hereinafter.

Mounted in stationary position in the rear of the cabinet 10 are a pair of spaced apart bases or pedestals 22 and 23 respectively (See FIGS. 1 and 3), mounted on a horizontally extending platform 20 spanning the rear vertically extending members 46 and a pair of vertically extending posts 20a supported on members 47. Pedestals 22 and 23 respectively support a pair of movie projectors 24 and 25 which may be conventional 16 mm. sound movie projectors manufactured by Eastman Kodak Company of Rochester, New York and having projecting lens housing 26 and 27 in the usual manner.

Mounted between the lens housing 26 and 27 is a pivotable mirror assembly generally designated 28 which includes a pair of spaced apart mirrors 29 and 30 (FIG. 3) having reflective surfaces 29a and 30a respectively. The mirrors are secured to a support block which is mounted on a vertical shaft 32 in the manner described in my copending U.S. Pat. application Ser. No. 697,201. A reversible electric motor shown schematically at 35 is provided in motor housing 35a and drives the shaft 32 via pulleys 35b and 35c, and a belt 35d trained therearound. The motor may comprise a conventional direct current reversible electric motor which is capable of driving the shaft 32 in opposite directions of rotation.

Figure 3:
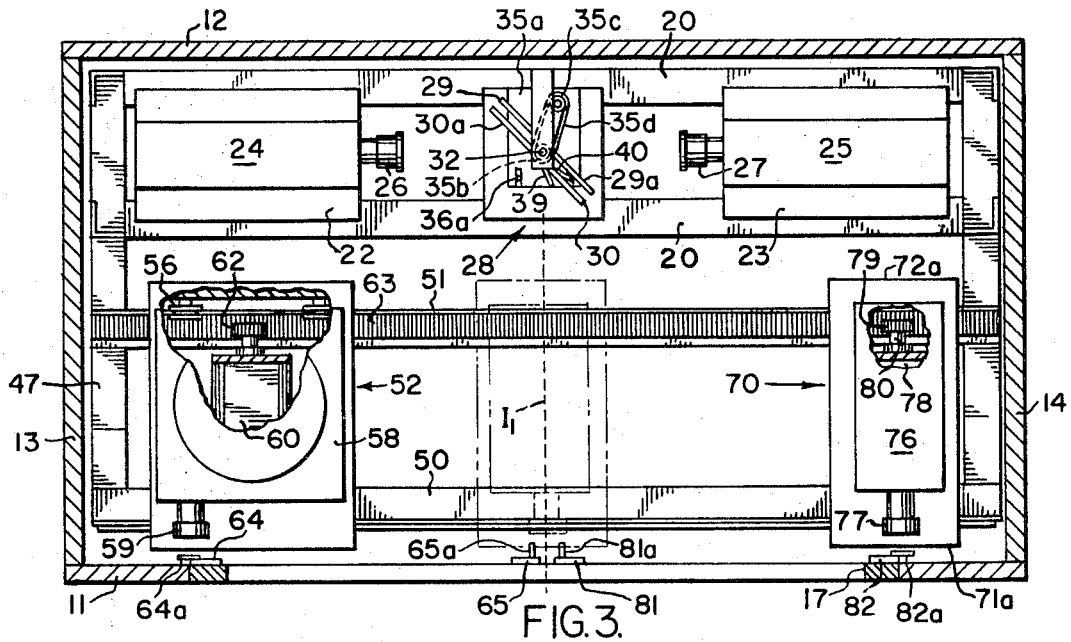
FIG. 3 is a sectional plan view taken along line 3—3 of FIG. 1.

As shown in FIGS. 1 and 3, each of a pair of motor stopping switches 36 and 37, provided in housing 35a, has an upwardly extending actuator finger 36a and 37a respectively, and fixed on the shaft 32 is a collar 38 having a pair of switch actuating fingers 39 and 40 provided thereon which are adapted to engage the limit switch actuator fingers 36a and 37a respectively, to stop the rotation of shaft 32 and locate the mirrors 29 and 30 in either the position shown in FIG. 3 or an opposed position wherein surface 29a would reflect the image emanating from lens 27 forwardly toward a screen. When the mirror assembly 28 is in the position in which it is shown in FIG. 3, it will transmit an image projected by the lens system 26 of the movie projector 24 forwardly.

Mounted on the left hand side of the framework as viewed in FIG. 1 is a carriage designated generally at 52 including a pair of vertically extending plate members 53 (FIG. 2) supporting a horizontally extending platform member 54. Mounted on the front plate member 53 are a pair of rollers 54 on shafts 55, while a pair of rollers 56 are mounted on a pair of shafts 57 which are secured to the rear vertical plate 53. The rollers 54 and 56 support the carriage 52 for movement on the tracks 50 and 51, respectively. Supported on the platform 54 is a conventional 35 mm. slide projector 58 which, for instance, could be the "Carousel" Projector manufactured by Eastman Kodak Company of Rochester, New York, which has a conventional projecting lens housing 59.

Mounted on the underside of the carriage 52 is a motor 60 having an armature shaft 61 on which a sprocket 62 is fixed. The sprocket 62 is provided in driving engagement with a rack 63 which extends between and is supported by the frame members 47. The motor 60 may suitably be another direct current reversible motor for driving the sprocket 62 in either direction and moving the carriage 52 and projector 58 supported thereon to and from a centered image projecting position where it will be in focal position to transmit an image through opening 17 to the remotely located screen S, along a common image projecting path $I_1$. Provided to stop the motor 60 at the remote and projecting positions are limit switches 64 and 65 (FIG. 3) which have actuator arms 64a and 65a respectively.

Carriage 70 is formed substantially identical to carriage 52 and includes opposite side walls 71 and 72, front and rear walls 71a and 72a, and a horizontally extending platform 73 supported thereon. Rollers 74 mounted on shafts 75 are secured to front and rear vertically extending walls 71a and 72a in a manner similar to that described relative to carriage 52 and are supported on the angle members 50 and 51. A film strip projector 76 having a forwardly directed lens 77 is mounted on carriage 70 and may be a conventional 35 mm. film strip projector, such as the Standard 750 Strip Projector, manufactured by Standard Projectors Inc., of Chicago, Illinois. Mounted on the underside of carriage 70 is a direct current reversible motor 78 having a sprocket 79 mounted on drive shaft 80 and engaging rack member 63. The motor 78 is effective to move the projector carriage 70 and projector 76 from the position shown in FIG. 1 to the center position where it is shown in broken lines in the image projecting position. Provided to stop the motor 78 at the centered and remote positions are a pair of limit switches 81 and 82 having actuator arms 81a and 82a respectively.

Figure 4:
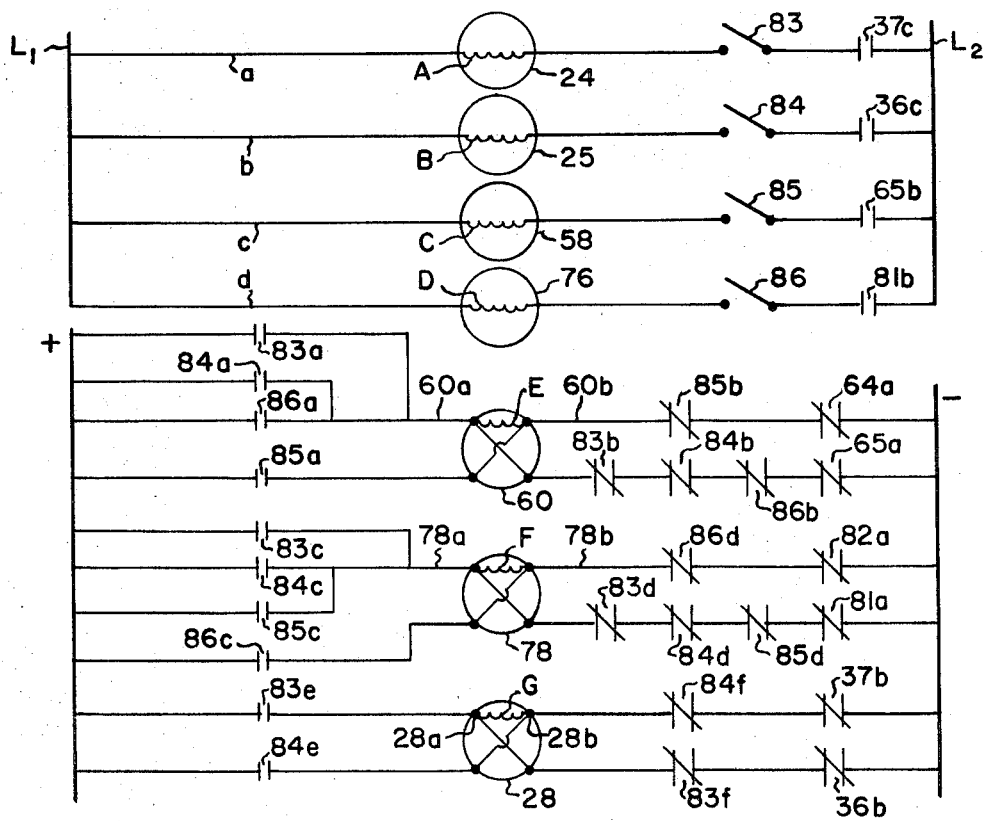
FIG. 4 is a schematic illustration of a typical electrical control system utilized to control the projection system illustrated in FIGS. 1—3.

In FIG. 4, an electrical control system is schematically illustrated wherein lines a, b, c, and d spanning lines $L_1$ and $L_2$ are connected in circuit with each of the motors which operate each of the projectors 24, 25, 58 and 76. In FIG. 3, the motors for each of the projectors 24, 25, 58 and 76 will be designated by reference characters 24, 25, 58 and 76 for convenience. Connected in series with the motors 24, 25, 58 and 76 across lines $L_1$ and $L_2$, which may be suitably connected to a conventional source of 110 volts 60 cycle alternating current are suitable start switches 83, 84, 85 and 86, respectively, and normally open sets of contacts 37c, 36c, 65b, and 81b respectively which are closed when the switches 37, 36, 65 and 81 are actuated. The switch 83 also includes normally open sets of contacts 83a, 83c, 83e which close when the switch 83 is closed and normally closed contacts 83b, 83d, and 83f which open when the switch 83 is closed. Similarly, the switch 84 includes normally open sets of contacts 84a, 84c, and 84e which close when the switch 84 is closed and normally closed contacts 84b, 84d, and 84f which open when the switch 84 closes. The switch 85 includes sets of normally open contacts 85a and 85c which close when the switch 85 is actuated and normally closed contacts 85b and 85d which open when the switch 85 is actuated. The switch 86 includes normally open contacts 86a and 86c and normally closed contacts 86b and 86d which close and open respectively when the switch 86 is closed. The armature windings for motors 24, 25, 58 and 76 are designated A, B, C, and D respectively. The windings for the reversible drive motors 60 and 78 associated with carriages 52 and 70 are shown at E and F respectively connected across a suitable source of direct current voltage. The winding for the reversible motor for the mirror assembly 28 is designated by the letter G. When current flows from terminal 60a to terminal 60b through winding E, the motor 60 is effective to drive the projector 52 to its outer position where it will engage normally closed limit switch 64. When current flows through winding E in a direction from terminal 60b to 60a, the motor 60 will be driven in a direction to move the projector 52 to its image projecting position where it will engage the normally closed limit switch 65. Similarly, when current flows through winding F from terminal 78a to 78b, the motor 78 will be effective to move the projector 76 to an outermost inoperative position where it will engage normally closed limit switch 82 whereas when current flows through winding F in a direction from terminal 78b to 78a, the motor 78 will be effective to move the projector 76 to its inner projecting position where it will engage normally closed limit switch 81. Connected in parallel between the line $L_1$ and the terminal 60a of winding E are the sets of normally open switch contacts 83a, 84a and 86a. Connected in series circuit relation with the negative side of the line and the terminal 60a are sets of normally closed contacts 83b, 84b, and 86b and the normally closed contacts 65a which are opened when the limit switch 65 is actuated.

The positive side of the DC line is also connected with the terminal 60b of winding E through the normally open contacts 85a. Connected between the terminal 60b of winding E and the negative side of the line are the set of normally closed contacts 85b and the normally closed limit switch contacts 64a which are opened when the limit switch 64 is actuated.

Connected in parallel between the terminal 78a and the positive side of the DC line are the sets of normally open contacts 83c, 84c and 85c. Connected in series circuit relation between the negative side of the line and terminal 78a are the sets of normally closed contacts 83d, 84d and 85d, and the normally closed contacts 81a which are opened when the limit switch 81 is actuated.

The positive side of the line is also connected with the terminal 78b of the winding F through the normally open contacts 86c. Connected between the negative side of the line and the terminal 78b are the normally closed contacts 86b, and the normally closed contacts 82a which are opened when the limit switch 82 is actuated.

The motor for turning the mirror 28 is designated at 28 and the winding therefore is indicated at G. The winding G is effective to rotate the mirror 28 to the position shown in FIG. 3 when current flows through winding G in a direction from terminal 28a to 28b. Connected between the terminal 28a and the positive side of the line are the normally open contacts 83e. Connected in series between the negative side of the line and the terminal 28b, are a set of normally closed contacts 84f, and the normally closed contacts 37b which are opened when the element 30 engages the actuator finger 37a. Connected between the positive side of the line and the terminal 28b are the normally open contacts 84e. Connected between the terminal 28a and the negative side of the line are the normally closed contacts 83f and the normally closed contacts 36b which are opened when the element 30 engages the actuator finger 36a.

When the switch 83 is closed to operate the projector 24, contacts 83e close to permit current to flow through winding G from the terminal 28a to terminal 28b until the mirror 20 reaches the position shown in FIG. 3 when the normally closed contacts 37b will open to stop the rotation of the mirror 28 and the contacts 37c will close to energize the winding A to operate the projector 24. Contacts 83f open when the switch 83 is closed to prevent the winding G from being short circuited. Simultaneously, if the projector 58 is in the center image projecting position, contacts 83a will close and contacts 83b will open to provide a current path through the winding E from the terminal 60a to the terminal 60b to move the projector 60 outwardly until the normally closed contacts 64a are opened, when it reaches its outermost position. If the projector 76 is in the center image projecting position, the contacts 83c close and the contacts 83d open to provide a current path through the winding F from the terminal 78a to the terminal 78b until the carriage 70 reaches the outermost position, when the normally closed contacts 82a are opened.

When the switch 84 is closed to operate the projector 25, the normally open contacts 84e are closed to permit current flow through the winding G from the terminal 28b to the terminal 28a through normally closed contacts 36b. The mirror moves so as to be aligned with lens 27 after which normally closed contacts 36b open to deenergize the winding G and the contacts 36c close to energize the winding B. Simultaneously, contacts 84a and 84c close and contacts 84b and 84d open to provide a current path through the windings E and F in a direction to move them outwardly as described before to a position where they will be in their outermost position when the normally closed contacts 64a and 82a will open.

When start switch 85 is closed to operate the projector 58, the mirror 28 is not affected, however, the contacts 85a are closed and the contacts 85b are opened to provide a current path through winding E from the terminal 60b to the terminal 60a so as to move the projector 60 inwardly to its image projecting position at which time it will open normally closed contact 65a to deenergize the winding E and close contacts 65b to energize the winding C. When the winding E is energized by current flowing from terminal 60b to 60a to move projector 60 to the image projecting position, the normally open contacts 85c are closed and the normally closed contacts 85d open to supply current to the winding F to drive the motor 78 so as to move the projector 76 outwardly until it engages normally closed contacts 82a.

When the start switch 86 is closed to operate the projector 76, the normally open contacts 86c are closed and the contacts 86d open to permit winding F to be energized by current flowing from terminal 78b to 78a to drive the carriage 70 inwardly until such time as the projector 76 reaches the center image projecting position at which time the normally closed contacts 81a will be opened to deenergize the winding F and the contacts 81b will close to energize the winding D. When the winding F is energized by current flowing from the terminal 78b to terminal 78a, the normally open contacts 86a are closed and the normally closed contacts 86b are opened to permit current to flow from the terminal 60a to the terminal 60b through the winding E until such time as projector 52 is moved to the outermost position when normally closed contacts 64a will be opened.

Thus, it can be seen that each of the projectors 58 and 76 will move to the outermost position when the start switches of any of the three remaining projectors are actuated in preparation of operating the respective projectors for projecting an image along the common image projecting path $I_1$. The mirror 28 will respond to the closing of the switches 83 and 84 (FIG. 4) to permit operation of the projectors 24 or 25 so as to permit the image from lenses 26 and 27 to be reflected to the screen 19. In addition, when the switches 83 and 84 are closed, projectors 58 and 76 are each removed to their inoperative positions if not already there.

While the system has been described with relation to four specific projectors, it should be understood that for each of the projectors 24, 25, 58 and 76, a plurality of projectors could be utilized.

Figure 5:
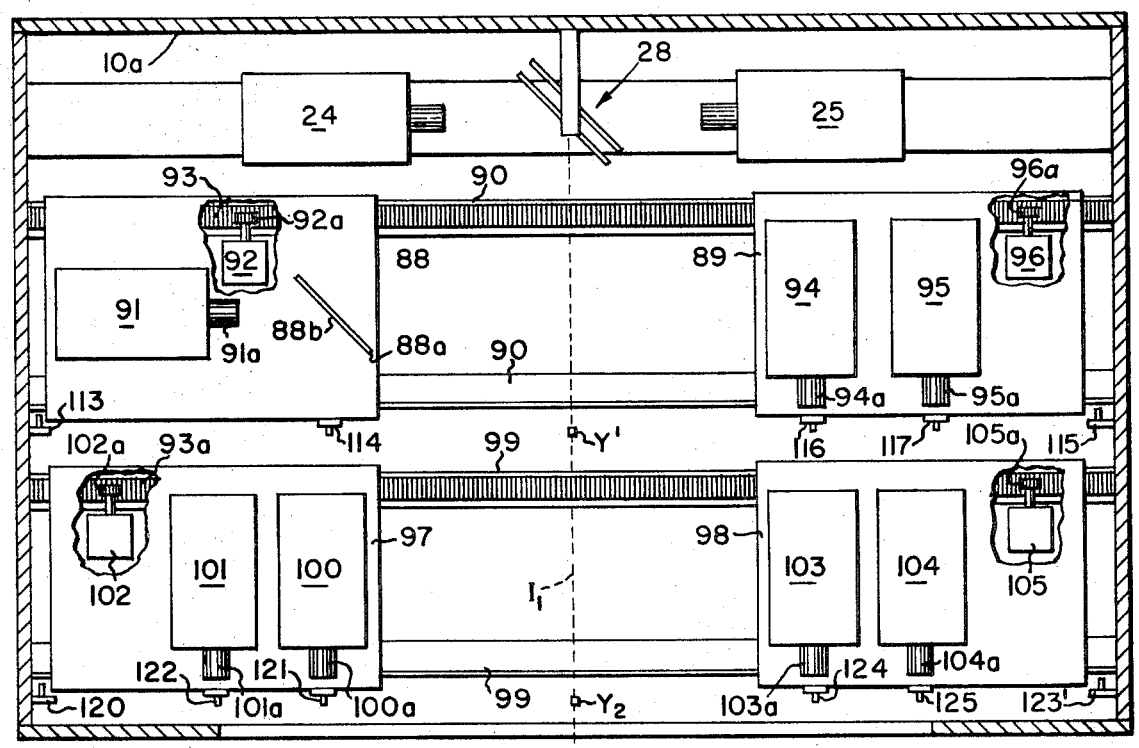
FIG. 5 is a schematic illustration of an alternate embodiment of a projection system incorporating the invention.

Referring now to the alternate embodiment schematically illustrated in FIG. 5, a cabinet or housing 10a stationarily mounts the projectors 24 and 25 between the pivotally movable mirror assembly 28 which reflects the images emanating from the projectors 24 and 25 along the common image projecting path $I_1$. The mirror assembly 28 is operated in the same manner as previously described. Positioned forwardly of the projectors 24 and 25 are a pair of longitudinally spaced apart carriages 88 and 89 movably mounted on a set of tracks 90 as before. The carriage 88 supports a conventional, electrically operable, movie projector 91 having a lens 91a projecting longitudinally therefrom in the usual manner. Mounted on the right side of carriage 88, in any suitable mechanical manner, is a fixed mirror assembly 88a having an image reflecting surface 88b inclined to the image projecting path $I_1$ and in alignment with the lens 91a. A DC reversible motor 92 is mounted on the underside of the carriage 88 in any acceptable manner and drives an output shaft mounted sprocket 92a provided in driving engagement with a rack 93 carried by the support 10 for shifting the projector 91 between its remote inoperative position, as shown in FIG. 5, and a central operative projecting position where its image will be reflected by the mirror surface 89a along the common image projecting path $I_1$.

The carriage 89 supports an electrically operable, slide projector 94 and an electrically operable film strip projector 95 having the usual lenses 94a and 95a which project forwardly. A DC reversible motor 96 is mounted on the underside of the carriage 89 and drives a sprocket 96a which is in driving engagement with the rack 93 for selectively shifting the projectors 94 and 95 between their remote inoperative positions, as shown in FIG. 5, and a common image projecting position where they will transmit an image along the image projecting path $I_1$.

Positioned forwardly of the projectors 91, 94 and 95 are a pair of longitudinally spaced apart carriages 97 and 98 movably mounted on a set of tracks 99. The carriage 97 supports electrically operable film strip and slide projectors 100 and 101 having forwardly projecting lenses 100a and 101a respectively. A rack 93a is supported on the frame 10 in the usual manner. A DC reversible motor 102 mounted on the carriage 97 drives an output shaft mounted sprocket 102a which is in driving engagement with the rack 93a for selectively shifting the projectors 100 and 101 between their remote, inoperative positions, as shown, and a common image projecting position where they will project an image along the common image projecting path $I_1$.

The carriage 98 similarly supports conventional slide and film strip projectors 103 and 104 having forwardly projecting lenses 103a and 104a respectively. A DC reversible motor 105 drives a sprocket 105a which is in driving engagement with the rack 93a for selectively shifting the projectors 103 and 104 between their remote inoperative positions, as shown, and a common image projecting position where they will project an image along the path $I_1$.

Figure 6:
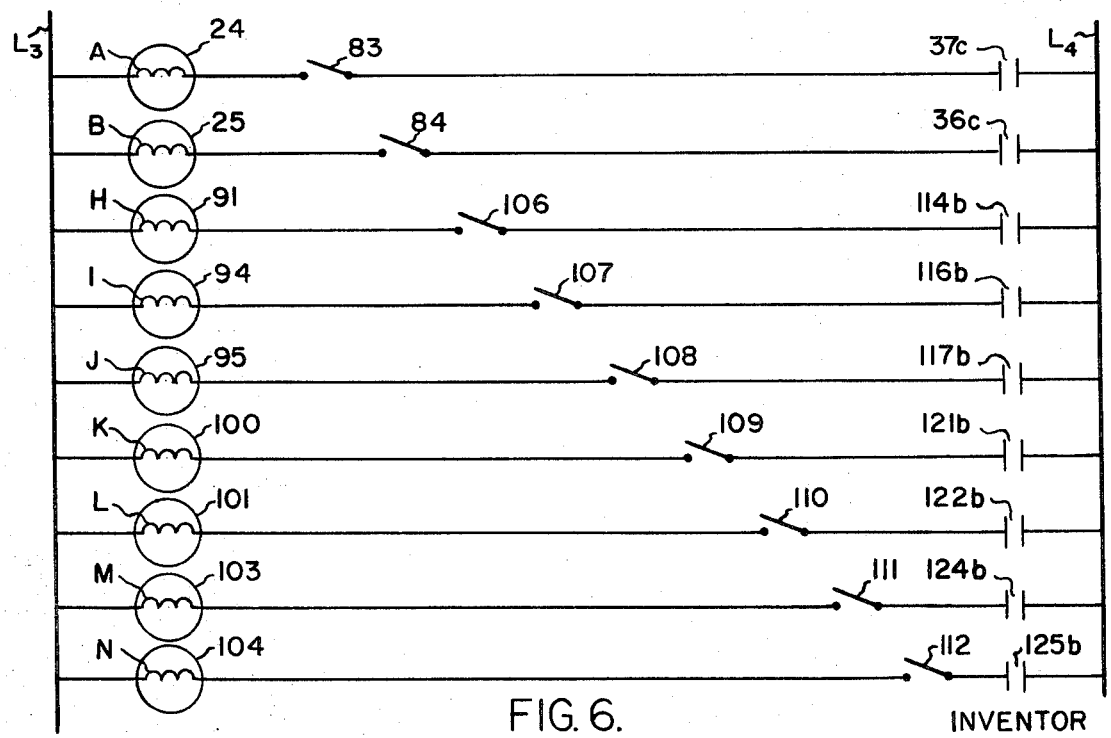
FIGS. 6 and 7 are schematic illustrations which together show a typical electrical control system utilized to control the projection system illustrated in FIG. 5.

In FIG. 6, an electrical control system is schematically illustrated wherein the windings for the operating drive motors for projectors 24, 25 and 91, 94, 95, 100, 101, 103, and 104 are designated by the numerals A, B and H—N respectively. Each of the windings A, B and H—N are connected in series across the lines $L_3$ and $L_4$, which are connected across a suitable AC source, with switches 83, 84 and 106—112 respectively, and the normally open contacts 37c, 36c, 114b, 116b, 117b, 121b, 122b, 124b, 125b respectively, which are closed when the limit switches 37, 36, 114, 116, 117, 121, 122, 124 and 125 are actuated respectively, in a manner to be described hereinafter. The switch 83 also includes normally open sets of contacts 83a, 83c, 83e, and 83g which are closed when the switch 83 is actuated and normally closed sets of contacts 83b, 83d, 83f, and 83h which are opened when the switch 83 is actuated. Each of the remaining switches 84 and 106—112 include corresponding normally opened and normally closed contacts, designated with similar letter subscripts, which close and open respectively when the switches 84 and 106—112 respectively are actuated. The switch 83 further includes a set of normally open contacts 83i and a set of normally closed 83j which are closed and opened respectively when the switch 83 is actuated. Similarly the switch 84 includes a set of normally open contacts 84i and normally closed contacts 84j which are closed and opened respectively when the switch 84 is actuated.

The armature windings for the motors 92, 96, 102 and 105 are designated by the letters O—R, respectively with the winding terminals for each motor being designated with the numerals 92, 96, 102 and 105 with a and b letter subscripts respectively. The winding for the reversible motor for the mirror assembly 28 is designated by the letter G. When current flows from the terminal 92a to terminal 92b through the winding O, the motor 92 is effective to drive the projector 91 to its inoperative position where it will engage the normally closed limit switch 113. When current flows through the winding O in a direction from the terminal 92b to the terminal 92a the motor 92 will be driven in a direction to move the projector 91 to its image projecting position where the normally closed limit switch 114 mounted on the carriage 88 will engage the stop $Y_1$ mounted along the image projecting path $I_1$ on the housing 10a.

Figure 7:
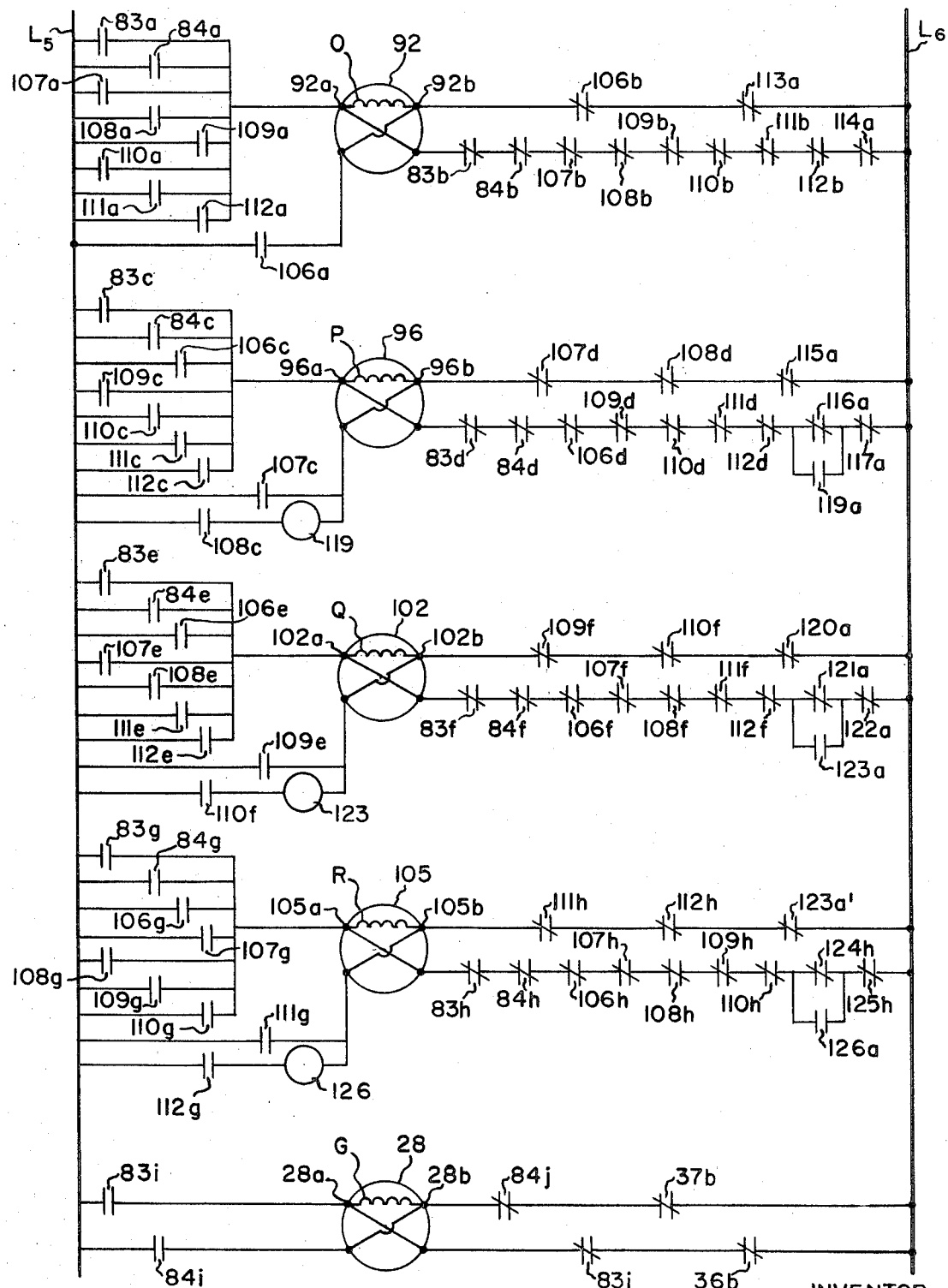

Referring now to FIG. 7, the windings O—R of the motors 92, 96, 102 and 105 are connected across lines $L_5$ and $L_6$ which are connected with a suitable source of direct current voltage. Connected in parallel between the line $L_5$ and the terminal 92a of the winding O are the sets of normally open contacts 83a, 84a, and 107a—112a. Connected in series between the line $L_6$ and the terminal 92b are the sets of normally closed contacts 106b and 113a, contacts 113a being opened when the projector 91 reaches its remote position and the carriage 88 engages the limit switch 113. The terminal 92b is also connected with the positive line $L_5$ through the normally open contacts 106a. Connected in series between the line $L_6$ and the terminal 92a are the normally closed contacts 83b, 84b, and 107b—112b and the normally closed contacts 114a which are opened by the limit switch 114 engaging the stop $Y_1$ when the projector 91 reaches its image projecting position.

When current flows through the winding P from the terminal 96a to the terminal 96b, the motor 96 is effective to drive the projectors 94 and 95 to their inoperative positions where the carriage 89 will contact the limit switch 115 suitably mounted on the frame 10a. When current flows through the winding P from the terminal 96b to the terminal 96a, the motor 96 will selectively shift one of the projectors 94 and 95 to a common image projecting position, depending on the projector to be operated. A pair of limit switches 116 and 117 are mounted on the carriage 89 for rendering the carriage shifting motor 96 inoperative when the projectors 94 and 95, respectively, reach the common image projecting position. Connected in parallel between the line $L_5$ and the terminal 96a are the normally open sets of contacts 83c, 84c, 106c, and 109c—112c respectively. Connected in series between the terminal 96b and the line $L_6$ are the normally closed contacts 107d and 108d and the normally closed contacts 115a which are opened when the limit switch 115 is actuated by the carriage 89 carrying the projectors 94 and 95 to their remote inoperative positions. Connected in parallel between the line $L_5$ and the terminal 96b are the normally open contacts 107c and a series circuit including the normally open contacts 108c and a relay 119. Connected in series between the terminal 96a and the line $L_6$ are the normally closed contacts 83d, 84d, 106d, and 109d—112d, and the normally closed contacts 116a and 117a which are opened when the projectors 94 and 95 reach their image projecting positions and the limit switches 116 and 117 respectively engage the stop $Y_1$. A set of normally open contacts 119a are connected in parallel with the contacts 116a and are closed when the relay 119 is energized. The sets of normally open contacts 116 b and 117b connected in series with windings I and J, are also closed when the limit switches 116 and 117 are actuated respectively.

When current flows through the winding Q in a direction from the terminal 102a to the terminal 102b, the motor 102 is effective to drive the projectors 100 and 101 to their inoperative positions where the carriage 97 will actuate the limit switch 120, mounted on the frame 10a, to open the normally closed contacts 120a. When current flows through winding Q from terminal 102b to terminal 102a, the motor 102 will selectively shift one of the projectors 100 and 101 to a common image projecting position, depending on the projector to be operated. A pair of limit switches 121 and 122, mounted on the front of the carriage 97, engage a stop $Y_1$, and render the carriage shifting motor 102 inoperative, when the projectors 100 and 101 respectively reach the common image projecting position. Actuation of the limit switches 121 and 122 opens the normally closed contacts 121a and 122a and closes the normally open contacts 121b and 122b respectively. Connected in parallel between the line $L_5$ and the terminal 102a are sets of normally open contacts 83e, 84e, 106e—108e, 111e and 112e. Connected between the terminal 102b and the line $L_6$ are the normally closed contacts 109f, 110f and 120a. Connected in parallel between the terminal 102b and line $L_5$ are the normally open contacts 109e and a series circuit including the contacts 110f and a relay 123. Connected in series between the terminal 102a in the line $L_6$ are the normally closed contacts 83f, 84f, 106f, 107f, 108f, 111f, 112f, 121a, and 122a. A set of normally open contacts 123a are connected in parallel with the contacts 121a and close when the relay 123 is energized.

When current flows through winding R in a direction from the terminal 105a to the terminal 105b, the motor 105 is effective to move the projectors 103 and 104 to their remote inoperative positions where the carriage 98 will engage the limit switch 123' to open the normally closed set of contacts 123a'. When current flows through the winding R in a direction from the terminal 105b to the terminal 105a, the motor 105 will selectively drive one of the projectors 103 and 104 from their remote positions to a common image projection position, depending on the projector to be operated. A pair of limit switches 124 and 125 are mounted on the carriage 97 for rendering the carriage shifting motor 105 inoperative when the projectors 103 and 104 respectively reach the common image projecting position. When the limit switches 124 and 125 engage the stop $Y_2$, the normally closed contacts 124a and 125a open and the normally open contacts 124b and 125b are closed respectively. Connected in parallel between the line $L_5$ and the terminal 105a are the normally open sets of contacts 83g, and 106g—110g. Connected in series between the terminal 105b and the line $L_6$ are the normally closed contacts 111h, 112h, and 123a. Connected in parallel between the terminal 105b and the line $L_5$ are the normally open contacts 111g and a series circuit including the normally open contacts 112g and a relay 126. Connected in series between the terminal 105a and the line $L_6$ are normally closed contacts 83h, 84h, 106h—110h, 124h, and 125h. A set of normally open contacts 126a are connected in parallel with the contacts 124h and are closed when the relay 126 is energized.

The motor for turning the mirror 28 is conveniently designated 28 in FIG. 7 and the winding therefore is indicated at G. The winding G is effective to rotate the mirror 28 to position shown in FIG. 5 when current flows through the winding G in a direction from the terminal 28a and the positive line $L_5$ are the normally open contacts 83i. Connected in series between the terminal 28b and the negative line $L_6$ are the normally closed contacts 84j and a set of normally closed contacts 37b which are opened when the element 30 engages an actuator finger 37a of a limit switch 37 as best shown in FIG. 3. Connected between the line $L_5$ and the terminal 28b are the normally open contacts 84i. Connected between the terminal 28a and the line $L_6$ are a set of normally closed contacts 83j and a set of normally closed contacts 36b which are open when the mirror 30 engages the actuator fingers 36a, disclosed generally in FIG. 5 and more specifically in FIG. 3.

The operation of the embodiment disclosed in FIG. 5 will be described with reference to FIGS. 6 and 7. If, for example, it is desired to project an image onto the screen X with the projector 91, the switch 106 would be actuated to the closed position and the normally open contacts 106a and the normally closed contacts 106b will close and open respectively to provide a current path from the positive side of the line $L_5$ through the winding O, from the terminal 92b to the terminal 92a, the normally closed switches 83b, 84b, 107b—112b, and 114a and then to the negative side of the line $L_6$. The motor 92 will drive the carriage 88 to the right until the projector 91 is in its image projecting position after which time the limit switch 114 will be actuated by the stop $Y_1$ and the contacts 114a will open. When the switch 106 is actuated, the normally open contacts 106c, 106e and 106g close and the normally closed contacts 106d, 106f, and 106h open to provide a current path through the windings P. Q and R from the terminals 96a, 102a and 105a to the terminals 96b, 102b and 105b respectively. Any of the carriages 89, 97 and 98, which are not in their remote positions, will thus be driven to their remote positions where they will engage the limit switches 115, 120, and 123 respectively to deenergize the motors P, Q and R, respectively. When the projector 91 is in its image projecting position, the mirror 89 is in a position to reflect the image emanating from the lens 91a along the image projecting path $I_1$. When the stop $Y_1$ actuates the limit switch 114, the normally open contacts 114b are closed to energize the projector operating motor winding H.

If it is now desired to shift the projector 94 into its image projecting position, the switch 106 is opened and the switch 107 is closed to close the normally open contacts 107c and open the normally closed 107d to provide a current path from the line $L_5$ through the winding T from the terminal 96b to the terminal 96a, the normally closed contacts 83d, 84d, 106d, 109d—112d, 116a and 117a, and then to the line $L_6$. The projector 94 will thus be driven to its image projecting position after which time the limit switch 116 will be actuated by the stop $Y_1$ and the normally closed contacts 116a will open to deenergize the winding P and the normally open contacts 116b will close to energize the projector operation winding I. Simultaneously with the actuation of the switch 107, the normally open contacts 107a and the normally closed contacts 107b will close and open respectively to provide a current path from the line $L_5$ through the winding O, from the terminal 92a to 92b, the normally closed contacts 106b and 113a, and then to the line $L_6$ to drive the projector 91 to its remote inoperative position after which time the limit switch 113 is actuated to open the normally closed contacts 113a to deenergize the winding O. Although the normally open contacts 107e and 107g close and the normally closed contacts 107f and 107h open when the switch 107 is actuated, the windings Q and R remain inoperative because the contacts 120a and 123a are in the open position.

If rather than moving the projector 94 into its image projection position, it were desired to move the projector 95 into the common image projecting position, rather than actuating the switch 107 and its associated contacts, the switch 108 is actuated to the closed position whereby the normally open contacts 108c and the normally closed contacts 108d are closed and opened respectively to provide a current path from the line $L_5$ through the relay 119, the winding P, from the terminal 96b to the terminal 96a, the normally closed limit switches 83d, 84d, 106d, 109d—112d, 119a and 117a and then to the line $L_6$. When the relay 119 is energized, the normally open contacts 119a close to short circuit the normally closed contacts 116a so that when the projector 94 reaches its image projecting position, the winding P will not be deenergized until such time as the projector 95 reaches its image projecting position and the carriage 89 engages the limit switch 117 to open the normally closed contacts 117a to deenergize the winding P. The normally open contacts 108a and the normally closed contacts 108b will close and open respectively to energize the winding O to drive the projector 91 to its inoperative position as previously described. It is important to note that the carriages mounting the respective projectors are individually movable to permit a selected one of the projectors to move toward its image projecting position while another of the projectors moves to an inoperative position.

The operation of the motors 102 and 105 for moving the projectors 100, 101, 103 and 104 between their remote and operative positions is generally similar to that of the projectors 94 and 95 and the description of same will not be repeated.

The system described heretofore could also be employed in what may be termed a self contained rear projection system in which case a translucent screen would be mounted in the opening 17. The image would then be projected upon the inner face of the screen in the usual manner. A plastic rear projection screen of this type is, for example, illustrated in my copending application entitled "Film Projection Apparatus," filed in the United States Patent Office on Feb. 9, 1966, under U.S. Pat. Ser. No. 526,215.

As disclosed in my copending U.S. Pat. application Ser. No. 697,201 a set of mirrors could be provided which include an upwardly inclined mirror which is disposed horizontally opposite the pivotable mirror 28 on wall 11 for reflecting the image upon a downwardly inclined mirror spaced from and in generally horizontal alignment with a screen placed in opening 17. In this manner, the additional set of mirrors would be utilized to transmit an image emanating from either lens 59 or lens 76a reflected by mirror assembly 28 to the inner face of a screen mounted in the housing. Thus, it can be seen that projectors 78 and 76 occupy a common image projecting path which coincides with the image projecting path reflected by the mirror 28 from the projectors 24 and 25.

It should be further understood that the control circuit is not limited to the specific details disclosed herein but that other elements could be incorporated for accomplishing this purpose.

It should be understood that the remote screen X may comprise either a front projection screen of the type commonly utilized in movie theaters, or a rear projection screen of the type illustrated in my above referenced copending U.S. Pat. application Ser. No. 526,215. If the rear projection screen is utilized with a projector, for example projector 76, which projects directly on the screen, it is merely necessary to reverse the film strip in the projector. If, however, a rear projection screen is utilized with a projector, for example projector 24, which has its image reflected by a reflective mirror surface 20a, the film need not be reversed in that the reflected image will be the mirror image of that emanating from the projector 24.

Since it is obvious that many changes and modifications can be made in the above described details without departing from the nature and spirit of the invention, it should be understood that the invention is not limited to said details except as set forth in the appended claims.

I claim:

1. A multiple unit projection system for transmitting images to a remotely located screen along a common image projecting path comprising:
    a frame;
    first and second projector means mounted thereon for individual movement between remote inoperative positions and operative, image projecting positions for projecting an image along said common image projecting path to said screen;
    each of said first and second projector means having projector operating drive means adapted to be operatively connected with a source of power;
    means for shifting one of said first and second projector means from its inoperative position to its image projecting position and for shifting the other of said first and second projector means from its image projecting position to its remote inoperative position when said one of said projector means is shifted to its image projection position.

2. A multiple unit projection system as set forth in claim 1 wherein said drive means for each of said first and second projector means is operative in response to said first and second projector means respectively reaching their respective image projecting positions.

3. A multiple unit projection system as set forth in claim 2 wherein said first and second projector means are movable to a common image projecting position.

4. A multiple unit projection system as set forth in claim 1 wherein said means for shifting includes;
    first means for shifting one of said first and second projector means from its inoperative position to its image projecting position; and
    second means for shifting the other of said first and second projector means from its image projecting position to its inoperative position when said first means shifts said one projector means to its image projecting position.

5. A multiple projection system as set forth in claim 3 wherein said first and second means for shifting each includes motor means mounted for movement therewith, sprocket means mounted on said motor means, and rack means mounted on said frame means, said sprocket means engaging said rack means to move said first and second projector means when said motor means is operated.

6. A multiple projection system as set forth in claim 3 including means for rendering said first and second means for shifting inoperative when said first and second projector means reach said remote inoperative positions and said projecting positions.

7. A multiple projection system as set forth in claim 1 wherein said means for shifting comprises:
    first motor means for shifting said first projector means to its inoperative position when said second projector means is shifted to its image projecting position;
    said first motor means including means for shifting said first projector means from its inoperative to its projecting position;
    second motor means for shifting said second projector means to its inoperative position when said first projector means is shifted to its image projecting position; and said second motor means including means for shifting said second projector means from its inoperative to its image projecting position.

8. A multiple projection system as set forth in claim 7 including means for rendering said first and second motor means inoperative when said first and second projector means reach their respective remote inoperative positions.

9. A multiple projector system as set forth in claim 1 wherein said first projector means comprises a pair of projectors mounted for simultaneous movement on said support means;
said means for shifting one of said first and second projector means from its inoperative position includes means for selectively shifting each of said pair of projectors to a common image projecting position.

10. A multiple projection system as set forth in claim 9 including means for selectively rendering said shifting means inoperative when said first and second projector means are shifted to said common image projecting position.

11. A multiple projection system as set forth in claim 1 wherein said projector means comprises:
third projector means mounted on said support means for projecting an image along said common image projecting path.

12. A multiple projection system as set forth in claim 11 wherein said third projector means is stationarily mounted on said support means; said screen is located forwardly of said first and second projector means; and including movable mirror means for selectively reflecting images from said third projector means along said common image projecting path to said screen.

13. A multiple projection system as set forth in claim 12 wherein said third projector means includes lens means directed to project an image on said mirror means which is inclined at an angle to said forward direction so as to project an image on said screen;
said first and second movable projector means having a plurality of forwardly directed lens means.

14. A multiple projection system as set forth in claim 13 wherein said projector means further comprises:
fourth projector means having lens means directed to project an image on said mirror means;
said third and fourth projector means being disposed on opposite sides of said mirror means in confronting position with their lens means substantially aligned; and
said mirror means being pivotally mounted about a vertical axis between said lens means.

15. A multiple projection system as set forth in claim 14 including motor means for pivoting said mirror means; and means for rendering said motor means for pivoting said mirror means inoperative when said mirror is positioned to project an image on said screen from either of said third or fourth projector means.

16. The multiple unit projection system set forth in claim 1 wherein said shifting means includes motor and control means for shifting one of said first and second projector means from its inoperative position to its image projecting position and for automatically shifting the other of said first and second projection means from its image projecting position to its inoperative position when said one projector means is shifted to its image projecting position.

17. A multiple projection system as set forth in claim 13 wherein said means for shifting said first and second projector means comprises:
first motor means for driving said one projector means to its inoperative position when the other of said first and second projector means is shifted to its operative position or when said mirror means is pivoted;
said first motor means including means for driving said one projector means from its inoperative to its projecting position; and
second motor means for driving the other of said projector means to its inoperative position when said one projector means is shifted to its operative position or when said mirror means is pivoted;
said second motor means including means for driving said other projector means from its inoperative to its projecting position.

18. A multiple projection system as set forth in claim 11 wherein said third projector means is movably mounted on said support means between a remote, inoperative position and an operative image projecting position for projecting an image along said common image projecting path; and means for shifting said third projector means to said inoperative position when either of said first or second projector means is shifted to its image projecting position.

19. A multiple projection system as set forth in claim 18 wherein said means for shifting said third projector means includes:
motor means for shifting said third projector means to its inoperative position when one of said first and second projector means is shifted to its image projecting position;
said motor means including means for shifting said third projector means to its image projecting position.

20. A multiple projection system as set forth in claim 11 wherein said third projector means is movable from a remote inoperative position to an operative image projecting position; and including:
mirror means movable with said third projector means for reflecting images from said third projector means along said image projecting path when said third projector means is in its image projecting position; and
means for shifting said third projector means from said inoperative to its image projecting position when one of said first and second projector means is shifted to its image projecting position.

21. A multiple projection system as set forth in claim 1 wherein one of said first and second means includes mirror means movable therewith for reflecting images from said one projector means along said image projecting path when said one projector means is in said operative projecting position.

22. A multiple projector system as set forth in claim 21 wherein said drive means for said one projector means is operative in response to movement of said one projector means to its image projecting position.